United States Patent [19]
Heffron et al.

[11] 3,966,058
[45] June 29, 1976

[54] CRANKSHAFT TRANSFER MECHANISM

[75] Inventors: Allan J. Heffron, Freeland; Arthur L. Estry, Jackson; William F. Chalmers, Essexville, all of Mich.

[73] Assignees: C. M. Systems, Incorporated, Bay City; Crankshaft Machine, Jackson, both of Mich.

[22] Filed: June 30, 1975

[21] Appl. No.: 591,436

[52] U.S. Cl.............................. 214/1 BB; 198/20 R
[51] Int. Cl.².......................................... B65G 25/00
[58] Field of Search....................... 214/1 BB, 1 BT; 198/20 R, 218; 72/252

[56] References Cited
UNITED STATES PATENTS

| | | | |
|---|---|---|---|
| 2,584,836 | 2/1952 | Blumensaadt..................... | 214/1 BB |
| 2,771,716 | 11/1956 | Joyce............................. | 214/1 BB X |
| 3,184,031 | 5/1965 | Dunlap.......................... | 214/1 BB X |
| 3,753,489 | 8/1973 | Tomioka et al................... | 214/1 BB |

*Primary Examiner*—Frank E. Werner
*Attorney, Agent, or Firm*—Beaman & Beaman

[57] ABSTRACT

Apparatus for transferring internal combustion engine crankshafts from a conveyor system to crankshaft machining apparatus capable of automatic functioning. The apparatus includes an overhead track having a translatable carriage mounted thereon and a crankshaft holder depends below the carriage having a pivoted jaw for gripping a crankshaft. A power driven drive shaft mounted on the carriage raises and lowers the holder through an eccentric connection therewith, and the eccentric pin includes a radially movable slide to which a jaw actuator mounted in the holder is connected. The slide includes a cam follower engaging a grooved cam track wherein rotation of the drive shaft produces relative displacement between the jaw actuator and the crankshaft holder during vertical displacement of the holder moving the jaw between holding and release positions during rotation of the drive shaft.

9 Claims, 5 Drawing Figures

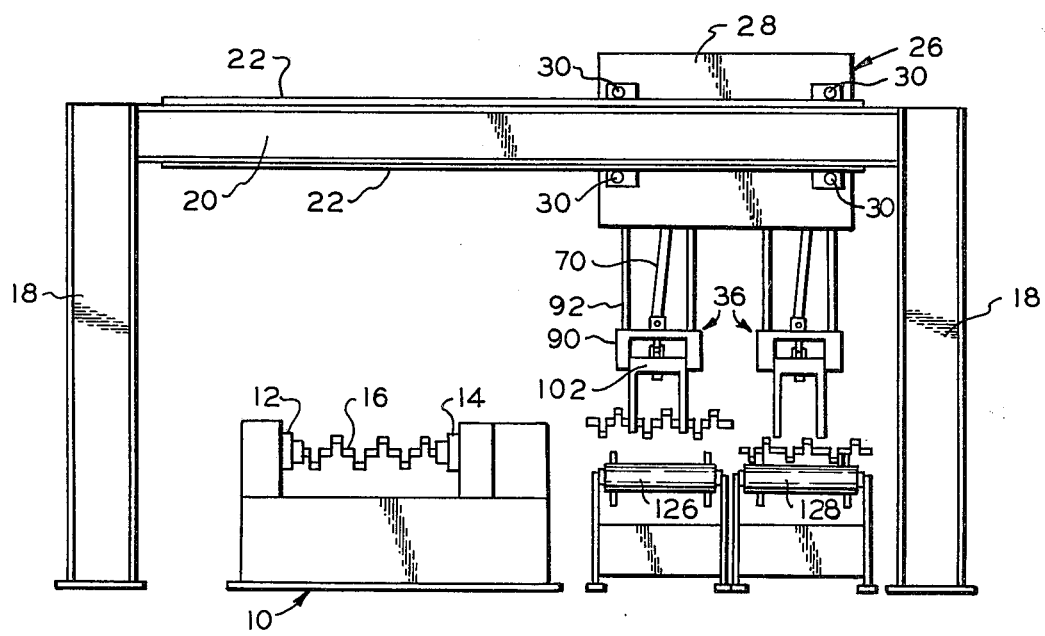
FIG_1
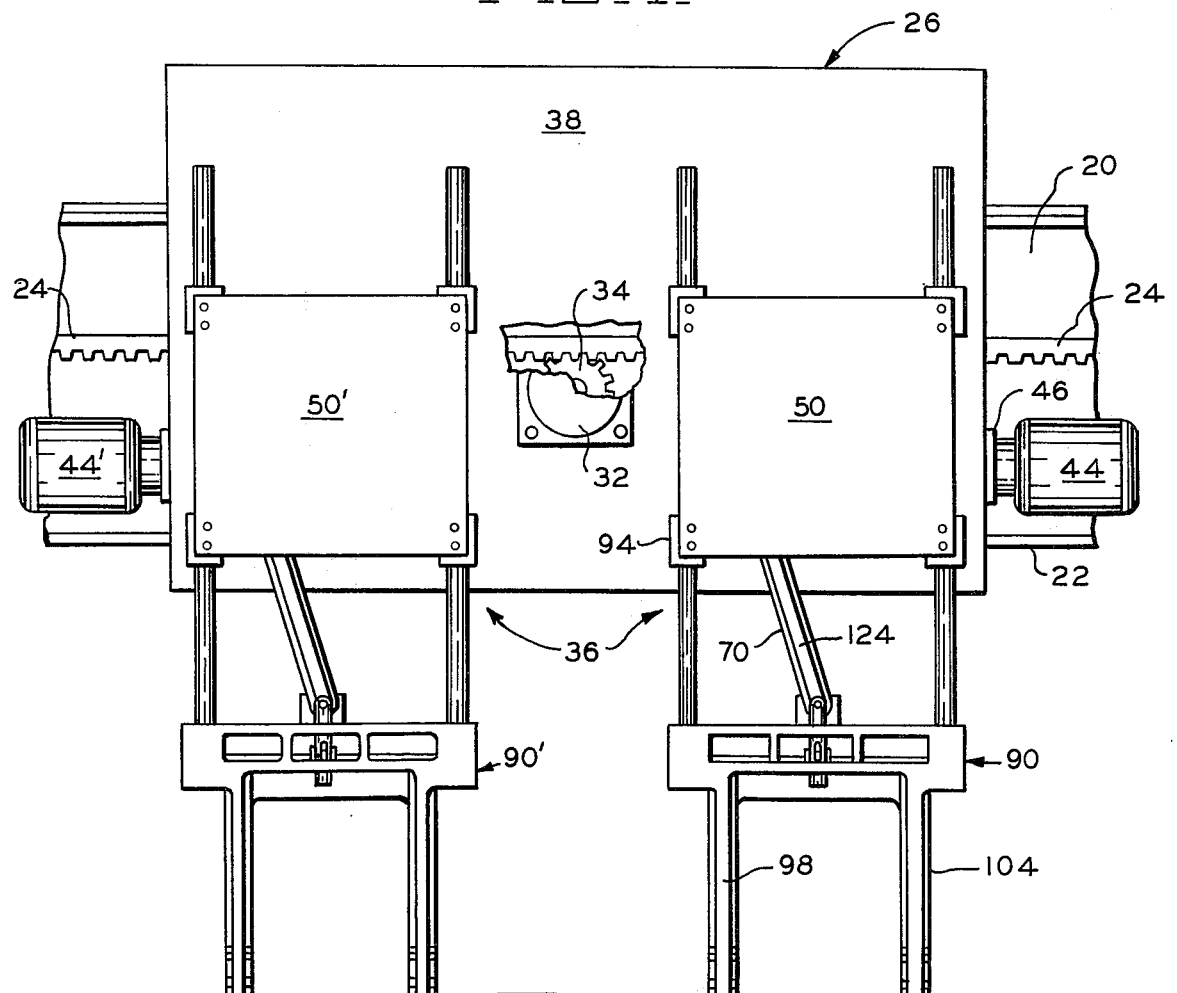
FIG_2

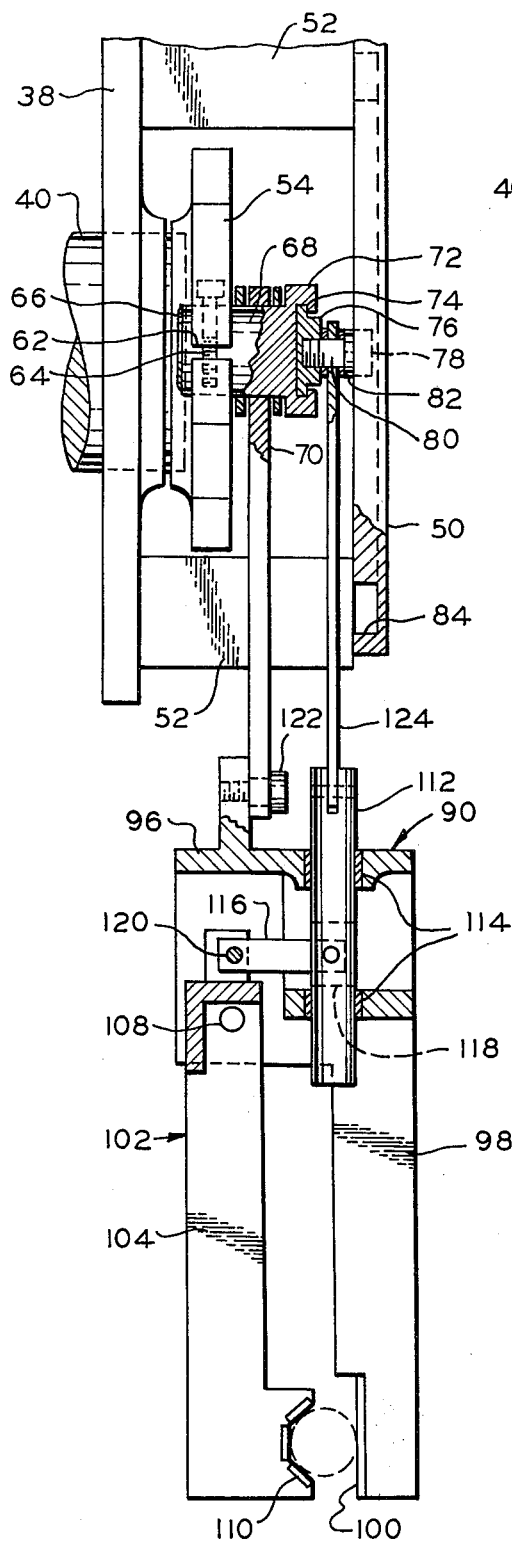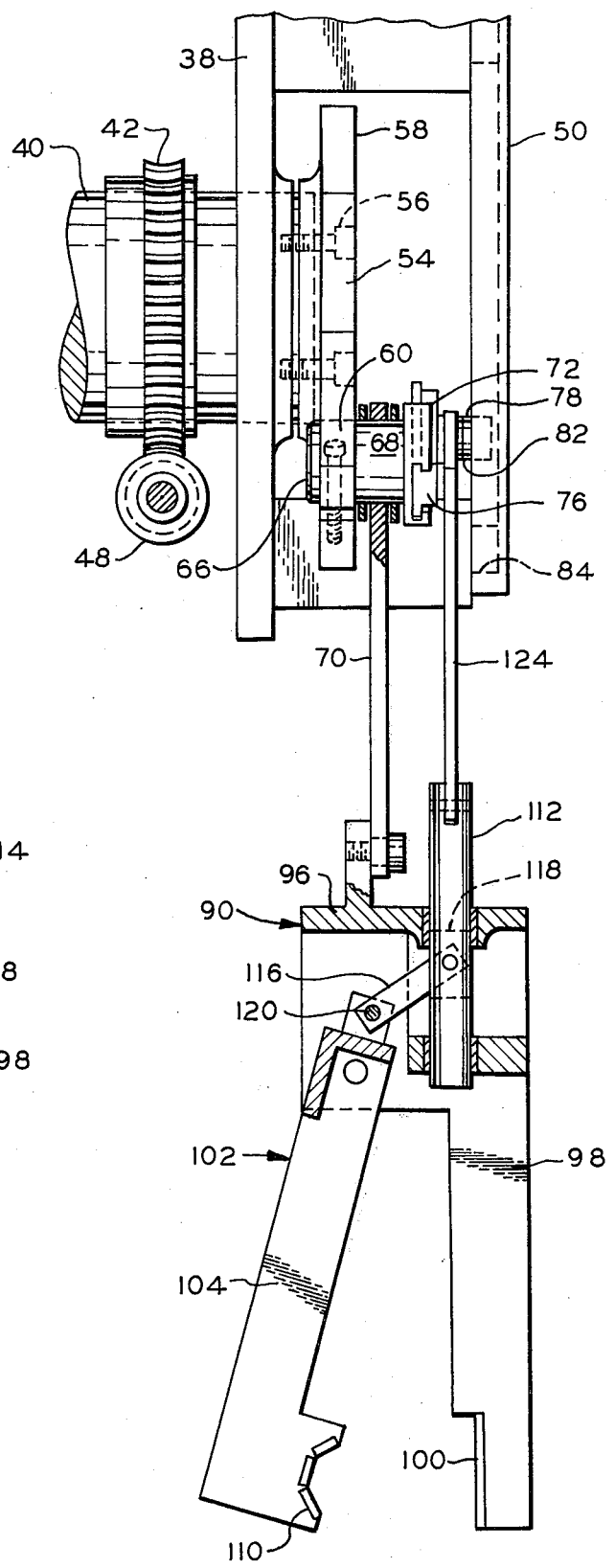
FIG. 4.
FIG. 5.

CRANKSHAFT TRANSFER MECHANISM

BACKGROUND OF THE INVENTION

The invention pertains to atuomatic transfer apparatus for crankshaft machining tools.

During the manufacture of crankshafts for internal combustion engines a series of machine tools are utilized to machine the locating surfaces, main bearings and crank bearings, and these tools usually operate automatically requiring only periodic supervision. Automatic transfer equipment as used with crankshaft machine tools is known whereby the crankshaft workpieces are transferred from a conveyor system into the machine tool, and from the machine tool to another conveyor after completion of the machining operation.

Transfer devices as used with crankshaft machine tools must be positive in operation, and capable of very accurately locating the crankshaft when placing the crankshaft workpiece within the turning machine. The transfer apparatus must be capable of quick decisive operation cycles, and postive operation, and crankshaft transfer devices may utilize a pair of crankshaft holding means mounted upon a common carriage whereby each translation of the carriage upon which the holders are mounted permits a loading and unloading of the machine tool.

Prior art crankshaft transfer apparatus have included a drive shaft having an eccentric pin mounted thereon whereby rotation of the drive shaft raises and lowers the crankshaft holder which is connected to the eccentric by a connecting rod. Also, prior transfer devices manufactured by the assignee have utilized pivoted jaws mounted upon the crankshaft holder operated by plunger type actuators connected to the drive shaft eccentric pin by means of a slide. In such devices a cam track has been used to position the slide in the pin for producing relative displacement between the jaw actuator plunger and holder at predetermined positions of the holder to permit engagement and release of the crankshaft.

However, devices of the aformentioned type have the disadvantage of not producing a positive gripping of the crankshaft at all rotational positions of the drive shaft, and vertical positions of the holder, and with such previous constructions it is possible that accidental release of the crankshaft within the holder could occur.

SUMMARY OF THE INVENTION

It is an object of the invention to provide crankshaft transfer apparatus which is automatic in operation, positive in its ability to grip and release the crankshaft during the operating cycle, and which prevents accidental operation of the crankshaft holder jaw at all positions of the operating cycle.

A further object of the invention is to provide crankshaft transfer apparatus which achieves an accurate vertical positioning of a crankshaft holder and operation of jaw structure defined upon the holder at predetermined vertical positions of the holder wherein the sequence of operation of the jaw with respect to the vertical position of the holder is positively maintained and controlled in a mechanical manner and a single drive motor is used to both vertically position the holder and acutate the crankshaft holding jaw.

In the practice of the invention a horizontally disposed overhead track is employed to support a carriage which may be alternately positioned over a conveyor system and a crankshaft machine tool. The carriage preferably supports a pair of identical crankshaft handling devices, each of which is capable of vertically raising and lowering a crankshaft holder having pivoted jaw structure defined thereon for gripping and releasing a crankshaft. The holder is mounted upon guide rods slidably supported within bushings mounted upon the carriage, and a vertical positioning of the holder is accomplished through a connecting rod interposed between the holder and an eccentric pin mounted upon a motor driven drive shaft. As the drive shaft rotates the eccentric pin and connecting rod will produce a vertical displacement of the crankshaft holder.

Operation of the pivoted jaw structure is accomplished through a vertically movable plunger mounted upon the holder and actuated by a connecting rod affixed at its upper end to a slide mounted upon the eccentric pin. The slide is mounted within a track which is radially disposed with respect to the axis of rotation of the drive shaft, and the slide structure includes a cam follower received within a continuous cam slot fixed upon the carriage. The cam slot includes a major portion concentric to the axis of rotation of the drive shaft, and a non-circular minor portion which produces a radial displacement of the slide during that portion of the holder vertical movement wherein the crankshaft is gripped or released by the holder jaw.

The radial orientation of the pin mounted slide, in cooperation with the cam slot through its cam follower, insures that at all positions of rotation of the drive shaft and eccentric pin the length of the slide track and the direction of orientation of the cam slot in which the cam follower is received, at any given position, will be transversely disposed to each other, which locks the cam follower within the cam slot at all times. Thus, this arrangement assures a positive positioning of the jaw actuating plunger at all rotational positions of the drive shaft.

The operation of crankshaft transfer apparatus in accord with the invention is rendered fully automatic by the use of limit switches and other conventional controls, and the mechanical interrelationship between the crankshaft holder movement and the jaw actuating plunger assures a proper synchronization of the jaw, and malfunctioning of the crankshaft holder jaw which would accidentally release the crankshaft is prevented, regardless of the operation of the limit switches and other control systems.

BRIEF DESCRIPTION OF THE DRAWINGS

The aforementioned objects and advantages of the invention will be appreciated from the following description and accompanying drawings wherein:

FIG. 1 is an elevational view of crankshaft transfer apparatus in accord with the invention illustrating the conveyor structure and the crankshaft machining tool, FIG. 2 is an elevational detail view of the rear side of the transfer carriage, the crankshaft holders being shown in a substantially elevated position, FIG. 4 is a sectional view of the apparatus of FIG. 3 as taken along section IV—IV thereof illustrating the jaw structure in the crankshaft holding position, and FIG. 5 is a side, elevational view, somewhat similar to FIG. 4, illustrating the position of the components with the jaw in the open position for receiving or releasing a crankshaft.

DESCRIPTION OF THE PREFERRED EMBODIMENT

Figure 3:
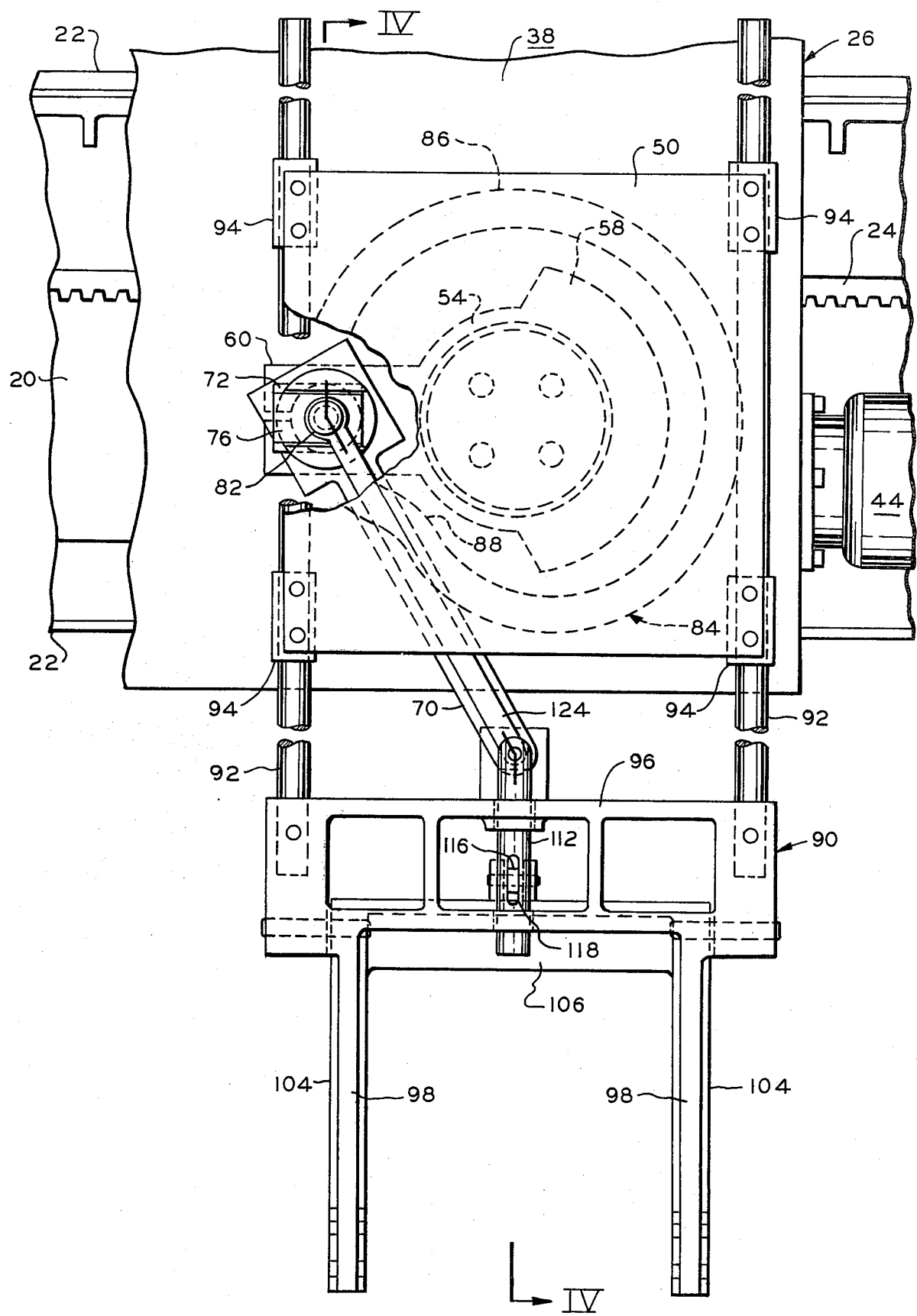
FIG. 3 is a detail, partially sectioned, view of one of the transfer mechanisms of the invention, the cam slot being shown in dotted lines.

The general orientation of crankshaft transfer mechanism in accord with the invention will be apparent from FIG. 1. A crankshaft machine tool is generally illustrated at 10, and such tool may be of the turning type used to machine the crankshaft main bearings, or crank bearings, or, the machine tool could be a grinder for grinding the crankshaft bearing surfaces. The machine is of a conventional nature including headstock 12 and tailstock 14 and each stock including chucking apparatus which permits loading of the chucks by a vertical lowering of the crankshaft workpiece 16 into the stock chucks, and removal therefrom by movement in an upward vertical direction. The chucking and unchucking of the machine tool constitutes no part of the present invention, and may be in accord with any conventional apparatus of known type capable of the desired functioning.

The transfer mechanism includes a pair of vertically disposed columns 18 which may be self-supported, as illustrated, or the left column may be mounted to the base of the machine 10 if it is decided to directly support a portion of the transfer mechanism upon the machine tool. A horizontally disposed track 20 extends between the upper portions of the columns, and the track includes parallel guide surfaces at 22, FIG. 2, as well as a parallel rack 24 having gear teeth defined thereon for cooperation with the drive pinion of the carriage motor, as will be later described.

A carriage 26 including a back plate 28, is mounted upon the track 20 for horizontal displacement thereon. The carriage includes guide means, such as wheels 30, which engage the track surfaces 22, and a motor 32 mounted upon the carriage drives a pinion 34 which engages the teeth of the rack 24. The motor 32 may be of the reversible electric or hydraulic type, and as the pinion rotates the carriage 26 will be translated to the right or left, FIG. 2, as desired.

As will be appreciated from FIG. 2, a pair of crankshaft transfer devices 36 are mounted upon the carriage 26. The devices 36 are identical, and, thus, only one will be described, primed reference numerals being utilized with the non-described device to indicate identical structure.

A support plate 38 is mounted upon the carriage backplate 28, by suitable spacing sleeves and connectors, not shown, and a horizontally disposed drive shaft 40 is supported upon the backplate 28 and the plate 38 in suitable bearings to permit rotation of the drive shaft. The drive shaft includes a worm wheel 42 keyed thereto, FIG. 5, and a motor 44, FIG. 2, mounted upon the carriage includes an output shaft and suitable speed reduction gearing box 46 for driving a worm 48 meshing with the worm wheel 42. The motor 44 may be either electric or hydraulic, and is reversible to permit rotation of the drive shaft in either direction of rotation about its axis.

A cam plate 50 is mounted upon the plate 38 in spaced relationship thereto by spacers 52, FIGS. 4 and 5, and a counterweighted head 54 is located intermediate the plate 38 and the cam plate 50 bolted to the end of the drive shaft 40 by bolts 56. The head 54 includes a counterweighted portion 58, FIG. 3, and a radially extending portion 60 which is split at 62 and provided with a pinch bolt 64, FIG. 5, for securely holding the eccentric pin 66. The eccentric pin 66 is received within a hole defined in the head radial portion 60, and tightening of the pinch bolt 64 prevents rotation of the pin relative to the head. The radial offset of the axis of the pin 66 from the axis of the drive shaft 40 is predetermined to equal one half of the maximum vertical displacement of the crankshaft holders associated therewith.

The pin 66 includes a cylindrical portion 68 which functions as a bearing surface for the holder connecting rod 70 and the pin is provided with an enlarged head 72 at its outer end. Within the head 72 is defined a guideway, in the form of a T-slot 74. A slide 76 is closely received within the slot 74 for reciprocation therein, and a cam follower 78 is screwed into the slide 76, FIG. 4. The cam follower 78 includes a stem 80 and a roller head 82 which is received within a cam slot 84 defined in the inner side of the cam plate 50 of a width as to closely receive the cam follower roller head.

The configuration of the cam slot 84 is best appreciated from FIG. 3. The major portion 86 of the cam slot is of a circular configuration concentric to the axis of rotation of the drive shaft 40. However, an inwardly offset portion 88 is defined in the cam slot at approximately the "8 o'clock" position of the cam slot as viewed in FIG. 3.

The crankshaft holder 90 depends below the carriage 26 and is mounted upon a pair of guide rods 92 slidably supported within bushings 94 mounted upon the carriage. The guide rods permit the holder 90 to move in a linear vertical direction at right angles to the traversing direction of movement of the carriage along the track 20. The configuration of the holder 90 is best appreciated from FIGS. 4 and 5, and includes an upper portion 96 having a pair of spaced downwardly extending stationary clamping anvils 98. The clamping anvils are provided at their lower end with a crankshaft engaging surface defined by the non-marring pad 100.

A movable jaw 102 is mounted on the holder portion 96 and the jaw is of a U-configuration, FIG. 1, whereby the downward extending portions 104 are in aligned opposed relationship to the anvils 98, and the base 106 is pivotally mounted to the holder portion 96 by a pivot pin 108. The lower end of the jaw portions 104 are provided with a recessed crank holding notch 110, which may be lined with a non-marring material, and as each notch is in opposed relationship to an anvil 98 it will be appreciated from FIG. 4 that in the closed position the jaw notch may grip a bearing surface of the crankshaft 16 for holding the same, and as the portions 104 are axially spaced with respect to the crankshaft 16 the crankshaft may be readily handled.

Actuation of the jaw 102 is accomplished through a plunger 112 slidably supported in the holder portion 96 within guide bearing 114. A toggle linkage 116 pivotally received within a diametrical slot 118 in the plunger 112 engages with a pivot 120 affixed to the jaw portion 106 above the pivot 108. Thus, as the plunger 112 is moved upwardly or downwardly in the holder 90 such movement causes a pivoting of the jaw 102 as will be appreciated from FIG. 5 wherein a relative "upward" displacement of the plunger has occurred with respect to the holder portion 96.

Vertical positioning of the holder 90 is accomplished through the connecting rod 70 which is journaled at its upper end upon the pin portion 68 between spacing washers, and the bolt 122 mounted at the lower end of the connecting rod 70 pivotally connects the rod to the holder portion 96. Thus, it will be appreciated that as the drive shaft 40 and the head 54 rotate, the connecting rod 70 will raise and lower the holders 90 as the guide rods 92 slide through their guide bushings.

The actuation of the jaw 102 and plunger 112 is produced by the connecting rod 124 which is pivotally attached at its lower end to the plunger, and is journaled upon the slide mounted cam follower stem 80, FIG. 4. Thus, it will be appreciated that the connecting rod 124, and plunger 112 are mechanically related in a positive manner to the pin 66, and connecting rod 70 which positions the holder 90.

The radius of the circular cam slot portion 86 as measured at the center of the slot is identical to the radius of the axis of the eccentric pin 66 from the axis of the drive shaft 40. Thus, it will be appreciated that as the drive shaft and head 54 rotate the axis of the cam follower 78 will be in alignment with the axis of the pin 66, and as the drive shaft 40 rotates the holder 90 and plunger 112 will raise and lower in unison since the distances between the pivot axes of the connecting rods 70 and 124 are equal. Thus, as the cam follower 78 follows through the circular portion 86 of the cam slot 84, the plunger 112 will be in the position of FIG. 4 holding the jaw 102 in its crankshaft holding position as illustrated. When the cam follower 78 engages the cam slot portion 88 the fact that the cam slot portion is of a lesser radial dimension than the cam slot portions 88 will translate the slide 76 inwardly toward the center of the drive shaft 40 "shortening" the movement of the connecting rod 124 causing the plunger 112 to "raise" with respect to the holder 90, as shown in FIG. 5, and pivot the jaw 102 to a crankshaft release or load position. As soon as sufficient rotation of the drive shaft 40 occurs to restore the cam follower roller 82 to the circular cam slot portion 86 the jaw is pivoted to the position of FIG. 4 and the holder 90 and plunger 112 will again move vertically in synchronization.

Since the longitudinal length of the T-slot 74 defined in the eccentric pin 66 is, at all times, radial, the only movement permitted by the slide 76 is radial as the cam follower 78 passes through the cam slot portion 88. Thus, since the length of the T-slot 74 is always transversely disposed to the configuration of the cam slot in which the cam follower is received the cam follower is positively "locked" within the cam slot and any relative movement between the plunger 112 and holder 90, other than that desired to be achieved as produced through the cam slot portion 88, is prevented. This positive interrelationship between the holder and the jaw actuator plunger prevents inadvertent release of the crankshaft supported in the jaws.

In use, a pair of conveyors 126 and 128 are located as to extend below the carriage 26, FIG. 1, and upon conveyor 126 crankshafts 16 which have been finished by the machine 10 are placed, while on the conveyor 128 crankshafts to be machined are located.

Automatic controls, which form no part of the instant invention, are utilized to control the sequence of the operation of the crankshaft machine 10 and the transfer mechanism such that the carriage 26 will be translated across the track 20, as desired, due to the reversible operation of the traversing motor 32. The motors 44 and 44' will produce the desired raising and lowering of the holders 90 and 90', and the cam slots 84, and slides 76, and eccentric pins 66 will produce the desired jaw actuation as described above.

In a typical cycle of operation the carriage 26 will be positioned as shown in FIG. 1 wherein a crankshaft to be machined is about to be picked up from the conveyor 128 by a lowering of the holder 90' due to rotation of the associated drive shaft. Immediately prior to this operation, or concurrent therewith, the holder 90 may be lowered to place a finished crankshaft workpiece upon the conveyor 126. The carriage 26 is then translated to position the holder 90 over the crankshaft workpiece 16 within the machine 10, and is lowered to grasp the crankshaft in the machine and remove the same therefrom. The carriage 26 is then moved slightly to the left, FIG. 1, and a new workpiece 16 is lowered into the machine, and then the holder raised prior to the machining cycle. The carriage is then translated to the illustrated position over the conveyors 126 and 128 during the machining cycle and the sequence repeated.

The drive shafts 40 and 40' are not driven in a continuous direction of rotation during operation. Rather, each rotation of the shafts by their associated reversible motor is 360° in alternate clockwise and counterclockwise directions such that as the cam followers pass through the cam slot portion 88 it will be in opposite directions during the raising and lowering of the holder 90 assuring proper sequence of operation of the jaw for both releasing and receiving the crankshaft as the holder is raised and lowered. This reversing operation of the motor 44 is accomplished through appropriate limit switches and stops, not shown, and such operation is well within the skill of those familiar with the motor control art.

It will therefore be appreciated that the crankshaft transfer apparatus of the invention permits a positive synchronization between the vertical movement of the holder and the operation of the jaws, and because of the mechanical relationship, and the radial orientation of the T-slot 74 and slide 76 positive operation of the jaw is assured and inadvertent release of the crankshaft as to damage the crankshaft machining tool, or other apparatus, is prevented.

It is to be appreciated that various modifications to the illustrated embodiment may be apparent to those skilled in the art without departing from the spirit and scope of the inventive concept.

We claim:

1. Crankshaft transfer apparatus comprising, in combination, an elevated track having parallel guide surfaces defined thereon, a carriage mounted upon said track for movement thereon, a first drive motor mounted upon said carriage drivingly connected to said track for translating said carriage upon said track, vertically oriented crankshaft holder guide means affixed to said carriage, a crankshaft holder mounted upon said guide means movable in a vertical direction with respect to said carriage, said holder including a movable jaw pivotally mounted thereon, a horizontally disposed drive shaft rotatably mounted on said carriage, a second drive motor mounted on said carriage in driving connection with said drive shaft, a holder drive pin eccentrically mounted on said drive shaft, connecting means connecting said pin to said crankshaft holder whereby rotation of said drive shaft alternately raises and lowers said holder, jaw actuating means mounted in said holder for vertical movement with respect thereto connected to said movable jaw, such relative vertical movement actuating said jaw between crankshaft holding and release positions, a slide mounted upon said pin for radial movement relative to the axis of rotation of said drive shaft, means connecting said slide to said jaw actuating means, cam means mounted on said carriage, and a cam follower connected to said slide engaging said cam means radially positioning said slide in accord with the contour of said cam to produce predetermined operation of said jaw in accord with the rotational position of said drive shaft.

2. In crankshaft transfer apparatus as in claim 1 wherein said guide means comprise guide rods slidably mounted in said carriage and said holder is mounted upon said rods.

3. In crankshaft transfer apparatus as in claim 1 wherein said jaw actuating means comprises a plunger slidably mounted in said holder and a toggle link interconnecting said plunger to said jaw.

4. In crankshaft transfer apparatus as in claim 1 wherein said holder drive pin includes a free outer end, a head defined on said outer end, said slide being defined in said head.

5. In crankshaft transfer apparatus as in claim 4, a guideway defined in said head extending radially to the axis of said drive shaft, said slide being received within said guideway.

6. In crankshaft transfer apparatus as in claim 1, a cam plate mounted on said carriage adjacent said slide and parallel to the plane of movement of said slide and perpendicular to the axis of said drive shaft, said cam plate including an inner surface disposed toward said pin and slide, said cam means comprising a slot defined in said cam plate intersecting said inner surface, and said cam follower comprising a roller received within said slot.

7. In crankshaft transfer apparatus as in claim 6 wherein said slot includes a major portion concentric to the axis of said drive shaft and of a radial dimension equal to the radial eccentricity of said pin.

8. In crankshaft transfer apparatus as in claim 7 wherein said connecting means connecting said pin to said crankshaft holder comprises a connecting rod.

9. In crankshaft transfer apparatus as in claim 7, a guideway defined in said head extending radially to the axis of said drive shaft, said slide being received within said guideway, clamping means fixing said pin upon said drive shaft maintaining the radial orientation of said guideway to the axis of said drive shaft.

* * * * *